United States Patent Office 2,701,804
Patented Feb. 8, 1955

2,701,804

NOVEL MALONIC ACID DERIVATIVES AND PROCESS FOR THE MANUFACTURE THEREOF

Balthasar Hegedüs and Andreas Grüssner, Basel, Switzerland, assignors to Hoffmann-La Roche Inc., Nutley, N. J., a corporation of New Jersey No Drawing. Application April 9, 1953,
Serial No. 347,838

Claims priority, application Switzerland April 15, 1952

9 Claims. (Cl. 260—343.2)

The present invention concerns novel malonic acid derivatives and a process for the manufacture thereof. The said malonic acid derivatives are useful because of their inhibiting action on the coagulation of blood or as intermediates in the manufacture of substances with such activity.

The process provided by the invention comprises condensing, preferably at low temperature, an alkali metal compound of the general formula

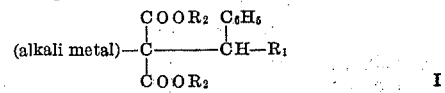

wherein $R_1$ represents an alkyl radical having not more than 3 carbon atoms, preferably a methyl, ethyl or propyl radical, and $R_2$ stands for a lower alkyl group, e. g. a methyl or ethyl group, with an acetyl-salicylic acid halide, preferably the chloride, to form a condensation product of the general formula

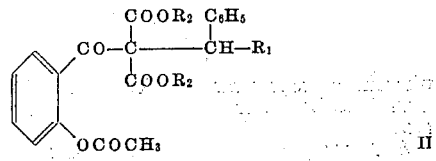

and treating the latter with an alkali alcoholate, preferably sodium methylate, in an organic solvent, such as ether or benzene, at a temperature not substantially exceeding room temperature, so as to produce a coumarin derivative of the general formula

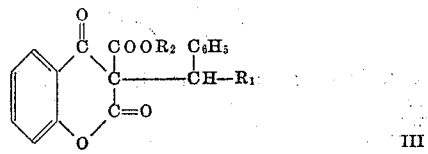

The group $R_2$ in the said coumarin derivative may easily be hydrolized off, for example by heating the same in alkaline medium. The acid thus formed immediately loses carbon dioxide and yields a compound of general formula

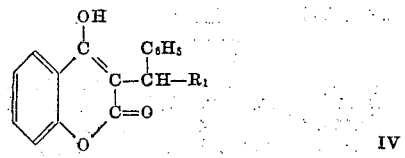

$R_1$ having the same meaning as above. The coumarin derivative III need not necessarily be isolated. Thus, instead of first cyclizing in the cold the condensation product II to the coumarin derivative III and thereafter hydrolizing and decarboxylating the latter, these distinct steps may be performed in one operation by heating compound II with a cyclizing and hydrolizing agent, such as for example an alkali alcoholate, preferably sodium methylate, in an organic solvent, e. g. benzene or ether, or with a dilute acid, e. g. sulfuric acid. The compound IV is directly obtained.

The intermediate products referred to above are novel compounds which, in a pure state, are colorless. They are well soluble in the usual organic solvents and may be distilled under reduced pressure. The compounds of general Formula III can ordinarily be brought to crystallization.

The coumarin derivatives of Formula IV are crystallized, stable compounds, which are only slightly soluble in water, but well soluble in the usual organic solvents. They have acidic properties and, accordingly, form water-soluble salts with strong bases. They show a remarkably strong inhibiting action on the coagulation of blood and may therefore be used in anticoagulating preparations.

Example 1

2.3 parts by weight of powdered sodium are suspended in 80 parts by volume of absolute benzene and to this suspension are added within 3 hours, at 18–25° C., 26.6 parts by weight of diethyl (1'-phenyl-ethyl)-malonate (Beilstein, Handbuch der organischen Chemie, volume 9, page 881). As soon as the powdered sodium has dissolved, 20 parts by weight of acetyl-salicylic acid chloride are added dropwise at 25–35° C. within one hour, whereupon the solution is refluxed for one additional hour, while stirring. The reaction mixture is poured into ice water, the benzene solution is extracted with water and finally concentrated in vacuo. The remaining viscous oil is distilled in high vacuo. The diethyl 1-(o-acetoxy-benzoyl)-1-(1'-phenyl-ethyl)-malonate thus obtained runs over at 185–190° C./0.03 mm. Hg.

19.5 parts by weight of diethyl 1-(o-acetoxy-benzoyl)-1-(1'-phenyl-ethyl)-malonate are dissolved in a mixture of 130 parts by volume of ethanol and 650 parts by volume of 0.3 N sulfuric acid, and the mixture is refluxed for 72 hours. The ethanol is then substantially removed by distillation, the reaction solution is adjusted to a weak phenolphthalein alkaline reaction by means of dilute sodium hydroxide solution and extracted with benzene in order to remove neutral impurities. The alkaline solution is acidified with dilute sulfuric acid and the precipitated oil, which soon solidifies, is separated and recrystallized in aqueous methanol. The compound obtained is 3-(1'-phenyl-ethyl)-4-hydroxy-coumarin of M. P. 211° C.

Example 2

8.3 parts by weight of powdered sodium in 300 parts by volume of benzene, 100 parts by weight of diethyl (1'-phenyl-propyl)-malonate (Beilstein, Handbuch der organischen Chemie, supplemental volume I, 9, page 387) and 72 parts by weight of acetyl-salicylic acid chloride are reacted together according to the procedure of Example 1 to form diethyl 1-(o-acetoxy-benzoyl)-1-(1'-phenyl-propyl)-malonate, which boils at 195–198° C./0.03 m. Hg.

10.3 parts by weight of diethyl 1-(o-acetoxy-benzoyl)-1-(1'-phenyl-propyl)-malonate are dissolved in 60 parts by volume of absolute ether and to this solution are added portionwise at 10° C., while stirring, 2.6 parts by weight of sodium methylate. The reaction mixture is stirred for 4 hours, whereupon it is poured into ice water. The ether solution is washed neutral with ice water. After having distilled off the ether, a thick oil consisting of 3-carbethoxy-3-(1'-phenyl-propyl)-4-oxo-dihydrocoumarin is obtained. This compound crystallises in butyl oxide and has a M. P. of 108–109° C.

The 3-carbethoxy-3-(1'-phenyl-propyl)-4-oxo-dihydrocoumarin may be hydrolized and decarboxylated as follows: The crude product is heated to 85° C. for ½ hour with 100 parts by volume of 5% aqueous sodium hydroxide, while agitating or stirring. To remove traces of undissolved oil, the cooled solution is treated with 1 part by weight of charcoal, whereupon it is filtrated and acidified to Congo reaction with dilute sulfuric acid. The 3-(1'-phenyl-propyl)-4-hydroxy-coumarin formed is separated off and recrystallized in 80% ethanol, whereupon it melts at 178–179° C.

Example 3

α-Phenyl-butyl bromide (Beilstein, Handbuch der organischen Chemie, supplemental volume II, 5, page 318) is reacted with diethyl malonate to form the diethyl (1'- phenyl-butyl)-malonate of B. P. 165–168° C./10 mm. Hg. According to the procedure of Example 1, 2.3 parts by weight of powdered sodium in 80 parts by volume of absolute benzene, 29 parts by weight of diethyl (1'-phenyl - butyl) - malonate and 20 parts by weight of acetyl-salicylic acid chloride are reacted to produce diethyl 1 - (o - acetoxy - benzoyl) - 1 - (1'-phenyl - butyl)-malonate of B. P. 203–206° C./0.03 mm. Hg.

45 parts by weight of diethyl 1-(o-acetoxy-benzoyl)-1-(1'-phenyl-butyl)-malonate are dissolved in 150 parts by volume of absolute benzene and to the solution formed are slowly added at 40° C. 20 parts by weight of sodium methylate. Thereupon, the mixture is stirred for 3 hours at 45–50° C. The reaction solution is extracted with 600 parts by volume of ice water, the alkaline aqueous solution is acidified with sulfuric acid and the precipitated 3-(1'-phenyl-butyl) - 4 - hydroxy - coumarin, which soon crystallizes, is sucked off. After recrystallization in ethanol, this product has a M. P. of 201–202° C.

What we claim is:

1. A process which comprises condensing an alkali metal compound of the general formula

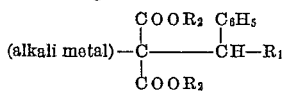

wherein $R_1$ represents an alkyl radical having not more 3 carbon atoms, and $R_2$ stands for a lower alkyl group, with acetyl-salicylic acid chloride to form a condensation product of the general formula

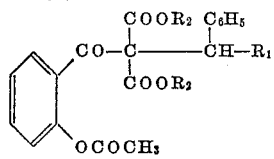

$R_1$ and $R_2$ having the same meaning as above, and treating the said condensation product with an alkali alcoholate in an inert solvent, at a temperature not substantially exceeding room temperature, so as to produce a coumarin derivative of the general formula

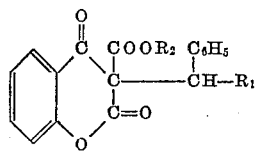

$R_1$ and $R_2$ having the same meaning as above.

2. A process which comprises condensing an alkali metal compound of the general formula

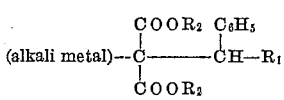

wherein $R_1$ represents an alkyl radical having not more than 3 carbon atoms, and $R_2$ stands for a lower alkyl group, with acetyl-salicylic acid chloride to form a condensation product of the general formula

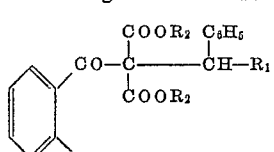

$R_1$ and $R_2$ having the same meaning as above.

3. A process which comprises heating a compound of the general formula

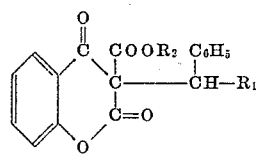

wherein $R_1$ represents an alkyl radical having not more than 3 carbon atoms, and $R_2$ stands for a lower alkyl group, in aqueous alkaline medium so as to produce a coumarin derivative of the general formula

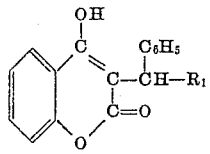

$R_1$ having the same meaning as above.

4. A compound of the general formula

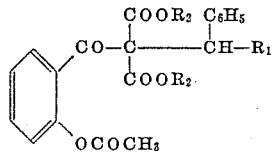

wherein $R_1$ represents an alkyl radical having not more than 3 carbon atoms, and $R_2$ stands for a lower alkyl group.

5. A compound of the general formula

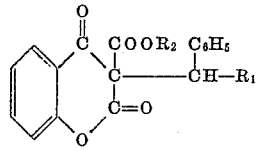

wherein $R_1$ represents an alkyl radical having not more than 3 carbon atoms and $R_2$ stands for a lower alkyl group.

6. A compound selected from the group consisting of those having the formula

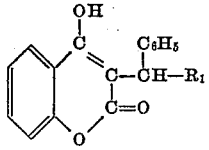

wherein $R_1$ represents an alkyl radical having not more than three carbon atoms and water-soluble salts thereof with strong bases.

7. 3-(1'-phenyl-ethyl)-4-hydroxy-coumarin.
8. 3-(1'-phenyl-n-propyl)-4-hydroxy-coumarin.
9. 3-(1'-phenyl-n-butyl)-4-hydroxy-coumarin.

References Cited in the file of this patent

UNITED STATES PATENTS 2,471,047  Stahmann et al. _____ May 24, 1949

OTHER REFERENCES

Bowman et al.: J. C. S., 1951, pp. 2753–8.
Borsche: Berichte 85, pp. 193–8 (1952).
Chem. Abst., vol. 41, col. 6232 (1947).
Chem. Abst., vol. 3, p. 2978 (1909).
Anschutz et al.: Annalen 367, pp. 174, 225–6, 236 (1909).